P. Kelly.
Gas Generator.
Reissued Apr. 19. 1870.
No. 3924.
Fig. 1.
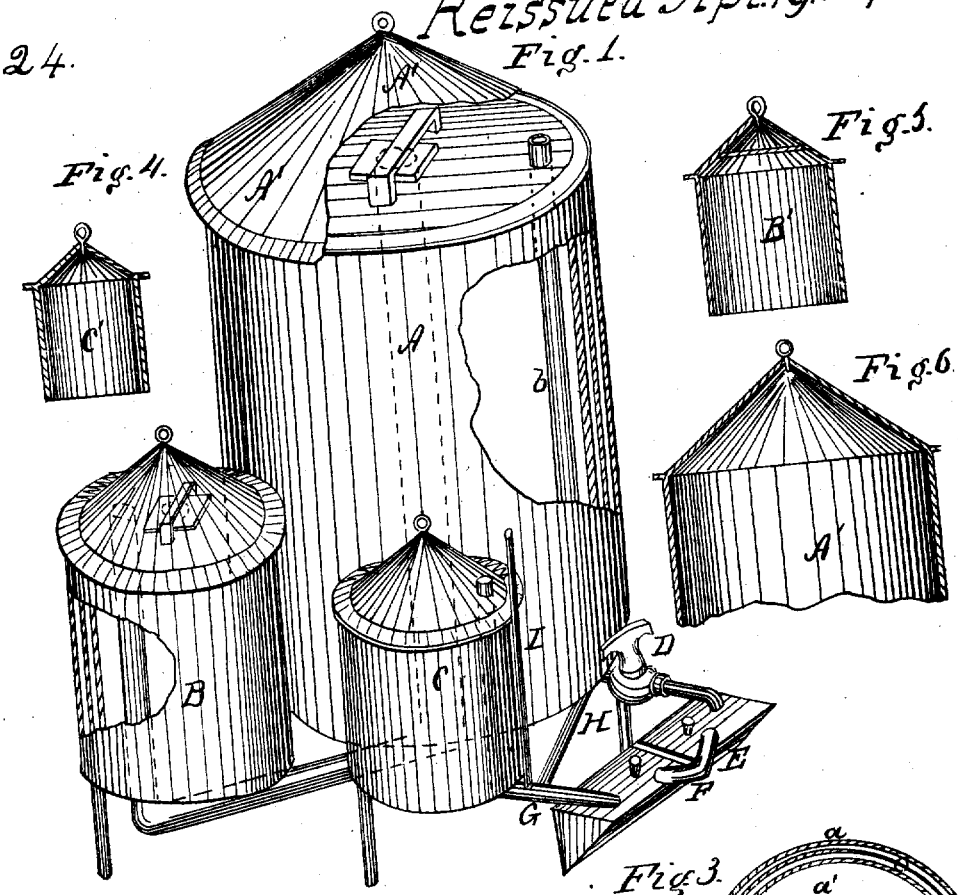
Fig. 4.
Fig. 5.
Fig. 6.
Fig. 2.
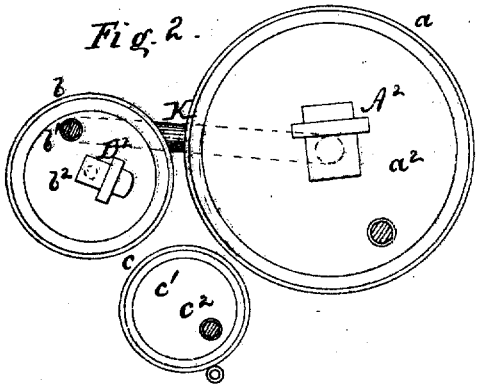
Fig. 3.
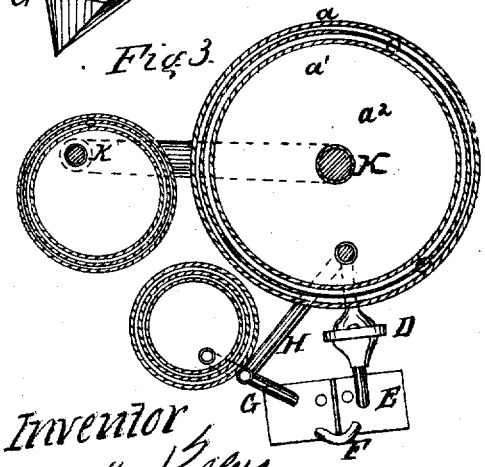
Witnesses
Jas. R. Edson
A. Ruppert
Inventor
Patrick Kelley
by
D. S. Kellogg & Co
his attys.

United States Patent Office.

BENJAMIN BEST, OF DAYTON, OHIO, ASSIGNEE OF PATRICK KELLY.

*Letters Patent No.* 92,317, *dated July* 6, 1869; *reissue No.* 3,924, *dated April* 19, 1870.

IMPROVEMENT IN GAS-GENERATORS.

The Schedule referred to in these Letters Patent and making part of the same.

*To all whom it may concern:*

Be it known that PATRICK KELLY, of Dayton, in the county of Montgomery and State of Ohio, did invent certain new and useful Improvements in Gas-Generators; and I do hereby declare that the following is a full, clear, and exact description of the same, reference being had to the annexed drawings, making part of this specification, in which—

Figure 1 is a perspective view of the apparatus;

Figure 2 is a plan view with the gasometers removed;

Figure 3 is a horizontal section;

Figures 4, 5, and 6 are elevations of the gasometers.

The same letters in all the figures indicate the same parts.

The invention of the said PATRICK KELLY relates to apparatus for carbureting atmospheric air by passing through gasoline, to make an illuminating gas; and His improvements consist in the combination and arrangement of various parts of such an apparatus, as will more fully appear from the following specification and claims.

In the annexed drawings—

A is a tank formed by two walls, $a$ and $a^1$, having between them a narrow space, to be filled with water to receive the air-holder $A^1$.

The latter is a cylindrical shell, open at its lower end, and closed air-tight on top by a suitable head, as shown.

A plate, $a^2$, extends across the top of the inner wall $a^1$ of the tank, the lower end being left open. This plate $a^2$ is secured air-tight to the tank, so that as the shell $A^1$ is raised, an air-tight chamber is formed under it, in which atmospheric air is to be stored, usually in a compressed state, the air-holder $A^1$ being suitably weighted for that purpose.

The chamber under the air-holder $A^1$ is supplied with atmospheric air by means of what may be termed an air-pump. The latter consists of a tank, B, constructed, like the tank A, of the walls $b$ and $b^1$, with an intervening space to be filled with water, and the plate $b^2$, for closing the upper end of the space enclosed by the inner wall $b^1$, the lower end being left open, to admit the air freely into such space.

A hollow plunger, $B^1$, formed like the air-holder $A^1$, is set into the water space between the walls of the tank B.

By raising this plunger, a vacuum would be formed under it, to fill which the air will rush in through the valve $B^2$, which covers a hole in the plate $b^2$ and opens upward only.

The air thus inhaled is forced, by depressing the hollow plunger, through a pipe, K, into the air-holder $A^1$, said pipe opening through the plate $b^2$, and, extending downward, passes from under the tank B, and is thence carried under the tank A and up through the plate $a^2$ thereof, opening under the air-holder $A^1$, where it is covered by a flap-valve $A^2$, which opens upward only.

By successively raising and depressing the hollow plunger $B^1$, the air-holder $A^1$ may be filled with atmospheric air under any desirable pressure.

For the purpose of carbureting the air thus stored, it is discharged from the air-holder $A^1$ through a pipe, D, into a chamber, E, said pipe being provided with a cock, to regulate the discharge.

E is a triangular chamber, to be filled or partly filled with gasoline, the chamber being, however, first charged with a small quantity of a solution of muriatic acid and zinc, to form a bed upon which the gasoline rests.

The chamber is divided into two or more compartments, and the pipe D is extended down to the bottom of the first of the series, and the air discharged into the bed of muriatic acid and zinc, whence, rising through the gasoline, it is, in its passage, carbureted partially.

The compartments are connected by a bent pipe, F, one end of which opens into the top of the first compartment, and the other extends to the bottom of the second compartment, where the partially-carbureted air is again discharged into the bed, to rise through the gasoline in said chamber, by which means it will be sufficiently carbureted for ordinary use.

The number of the carbureting-chambers may, however, if desired, be multiplied in the same manner by a continuous series of compartments and connecting-pipes.

The intensity of the illumination of the gas may be increased by first introducing within said chambers muriatic acid, and then adding the gasoline, and finally putting in as much zinc as will create a slight vapor while being dissolved.

The pipe G conducts the carbureted air or gas from the last chamber of the series, either into the gasometer C′, placed in a tank, C, or directly into the service-pipe I, through which the gas is carried away to be burned.

The gasometer C′ may be conveniently used for storing the gas, but, in most cases, it is preferred to dispense with it, so that there shall be only a very small amount of made gas in the carbureting-chamber at any one time.

A pipe, H, connected with the pipe G, leads under the pipe D transversely, terminating in a gas-burner, by means of which the air, passing through the pipe D may be heated, as it passes from the air-holder to the carbureting-chamber.

The waste heat from this gas-burner, opening into the space below the plate $a^2$, will tend to warm the air in the air-holder $A^1$, and thus facilitate its carbureting.

What I claim as the invention of the said PATRICK KELLY, and desire to secure by Letters Patent, is—

1. The combination of the tank B, hollow plunger $B^1$, induction-valve $B^2$, eduction-pipe K, valve $A^2$, air-holder $A^1$, and tank A, for pumping and storing atmospheric air, substantially as set forth.

2. The combination of the tank A, air-holder $A^1$, pipe D, and series of carbureting-chambers E, connected by pipes F, all constructed and arranged to operate substantially as set forth.

3. An apparatus for carbureting air, combining in its construction an air-pumping device, B $B^1$ $B^2$, a connecting-pipe, K, an air-storing device, A $A^1$ $A^2$, a connecting-pipe, D, and a series of carbureting-chambers, E, connected by pipes F, substantially as and for the purpose set forth.

In testimony whereof I have signed my name to this specification before two subscribing witnesses.

BENJAMIN BEST.

Witnesses:
SAMUEL WILD,
THOS. D. MITCHELL.